US010938630B2

(12) United States Patent
Wang et al.

(10) Patent No.: US 10,938,630 B2
(45) Date of Patent: Mar. 2, 2021

(54) SERVICE STATE TRANSITION METHOD AND APPARATUS

(71) Applicant: Huawei Technologies Co., Ltd., Guangdong (CN)

(72) Inventors: Xuewei Wang, Shenzhen (CN); Shixing Liu, Beijing (CN); Yinben Xia, Beijing (CN); Jun Su, Beijing (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 0 days.

(21) Appl. No.: 16/399,689

(22) Filed: Apr. 30, 2019

(65) Prior Publication Data

US 2019/0260634 A1    Aug. 22, 2019

Related U.S. Application Data

(63) Continuation of application No. PCT/CN2017/113537, filed on Nov. 29, 2017.

(30) Foreign Application Priority Data

Nov. 29, 2016    (CN) .......................... 201611074063.7

(51) Int. Cl.
*H04L 12/24* (2006.01)
*H04L 29/08* (2006.01)
*H04L 29/14* (2006.01)

(52) U.S. Cl.
CPC ...... *H04L 41/0672* (2013.01); *H04L 41/0654* (2013.01); *H04L 41/0668* (2013.01);
(Continued)

(58) Field of Classification Search
CPC ........................... H04L 41/0672; H04L 67/16
See application file for complete search history.

(56) References Cited

U.S. PATENT DOCUMENTS 8,533,303 B2    9/2013  Wikstroem
8,718,022 B2*   5/2014  Aoyama ............... H04W 24/00
                                                            370/335
(Continued)

FOREIGN PATENT DOCUMENTS

CN            1744512 A     3/2006
CN          103415085 A    11/2013
(Continued)

*Primary Examiner* — Parth Patel
(74) *Attorney, Agent, or Firm* — Womble Bond Dickinson (US) LLP

(57) ABSTRACT

Embodiments of the present application relate to the field of communications technologies, and provide a service state transition method and an apparatus, to implement a process of an automatic state transition between different service statuses. The method includes: obtaining a target service status and a current service status of a network service; determining a first transition condition for transiting the network service from the current service status to the target service status, where the first transition condition includes status information of a first dependent object on which execution of the network service depends; and transiting, based on the first transition condition, the first dependent object from a current first service status to a second service status indicated in the status information of the first dependent object, to enable the network service to be automatically transited from the current service status to the target service status.

17 Claims, 7 Drawing Sheets

(52) U.S. Cl.
CPC ...... *H04L 41/0816* (2013.01); *H04L 41/5051* (2013.01); *H04L 41/5054* (2013.01); *H04L 41/5058* (2013.01); *H04L 67/16* (2013.01); *H04L 69/40* (2013.01); *H04L 41/0893* (2013.01); *H04L 41/509* (2013.01)

(56) References Cited

U.S. PATENT DOCUMENTS

| | | | |
|---|---|---|---|
| 9,098,693 B2 * | 8/2015 | Pellegrino | G06F 21/41 |
| 9,219,642 B2 * | 12/2015 | Chen | H04L 41/0654 |
| 9,923,681 B2 * | 3/2018 | Zakrzewski | H04L 5/0032 |
| 2002/0161914 A1 * | 10/2002 | Belenki | H04L 47/10 709/235 |
| 2005/0050184 A1 * | 3/2005 | Boden | H04L 67/10 709/223 |
| 2005/0058064 A1 * | 3/2005 | Phelps | H04L 41/0893 370/225 |
| 2006/0050862 A1 * | 3/2006 | Shen | H04L 12/2856 379/219 |
| 2006/0139587 A1 | 6/2006 | Rossing et al. | |
| 2007/0183347 A1 * | 8/2007 | Gu | H04W 24/04 370/258 |
| 2007/0294364 A1 * | 12/2007 | Mohindra | G06F 8/61 709/217 |
| 2009/0325526 A1 * | 12/2009 | Chen | H04W 72/005 455/226.1 |
| 2010/0265919 A1 * | 10/2010 | Ma | H04W 72/04 370/332 |
| 2011/0084816 A1 * | 4/2011 | Briese | H04W 52/0229 340/10.34 |
| 2012/0246356 A1 * | 9/2012 | Shibata | G06F 1/3243 710/48 |
| 2013/0148707 A1 * | 6/2013 | Thibeault | H04N 21/2383 375/222 |
| 2014/0082432 A1 * | 3/2014 | Zhu | H04L 43/0817 714/49 |
| 2014/0115060 A1 * | 4/2014 | Kim | H04L 65/1093 709/204 |
| 2014/0115644 A1 * | 4/2014 | Kim | H04N 21/437 725/109 |
| 2014/0195681 A1 * | 7/2014 | Chan | H04L 41/0809 709/225 |
| 2014/0280958 A1 * | 9/2014 | Deleo | H04L 41/0813 709/226 |
| 2015/0117258 A1 * | 4/2015 | Kim | H04L 41/0833 370/254 |
| 2015/0365293 A1 * | 12/2015 | Madrigal | H04L 41/0893 709/221 |
| 2016/0182407 A1 * | 6/2016 | McCaughan | H04L 49/557 370/219 |
| 2017/0230257 A1 * | 8/2017 | Bruun | H04L 41/5054 |
| 2018/0139106 A1 * | 5/2018 | Senarath | H04L 67/16 |
| 2018/0145874 A1 * | 5/2018 | Steeves | H04L 41/069 |
| 2019/0260634 A1 * | 8/2019 | Wang | H04L 41/5058 |

FOREIGN PATENT DOCUMENTS

| | | |
|---|---|---|
| CN | 105099748 A | 11/2015 |
| CN | 105101328 A | 11/2015 |
| CN | 105490825 A | 4/2016 |
| CN | 106656580 A | 5/2017 |
| CN | 103999525 B | 12/2017 |
| WO | 2007/146367 A2 | 12/2007 |
| WO | 2015/187751 A1 | 12/2015 |

* cited by examiner

SERVICE STATE TRANSITION METHOD AND APPARATUS

CROSS-REFERENCE TO RELATED APPLICATIONS

This application is a continuation of International Application No. PCT/CN2017/113537 filed on Nov. 29, 2017, which claims priority to Chinese Patent Application No. 201611074063.7 filed on Nov. 29, 2016. The disclosures of the aforementioned applications are hereby incorporated by reference in their entireties.

TECHNICAL FIELD

Embodiments of the present application relate to the field of communications technologies, and in particular, to a service state transition method and an apparatus.

BACKGROUND

During a life cycle from start of run to end of run, a network service usually has a plurality of service statuses such as a degraded state (namely, a state in which a link is not disconnected, but quality of data transmission on the link is reduced; for example, a bit error ratio or a packet loss ratio is greater than a threshold), a faulty state, a capacity expansion state, and a quality of service state. There may be a plurality of association relationships between the plurality of service statuses, and different network configurations need to be performed when a transition between different service statuses is performed. For example, the capacity expansion state may be transited from the degraded state, or may be transited from the faulty state, and configuration content for the network device when the capacity expansion state is transited from the degraded state is usually different from configuration content for the network device when the capacity expansion state is transited from the faulty state.

However, currently, for this complex process of the transition between the service statuses, configuration content for the network device often needs to be manually set. Alternatively, corresponding program software may be developed to implement a transition from a service status 1 to a service status 2. However, when a service status is changed or an association relationship between the service statuses is changed, the program software is not applicable any longer.

SUMMARY

Embodiments of the present application provide a service state transition method and an apparatus, to implement a process of an automatic state transition between different service statuses.

To achieve the foregoing objective, the following technical solutions are used in the embodiments of the present application:

According to a first aspect, an embodiment of the present application provides a service state transition method, including: obtaining, by a management node, a target service status and a current service status of a network service; determining, by the management node, a first transition condition for transiting the network service from the current service status to the target service status, where the first transition condition includes status information of a first dependent object on which execution of the network service depends; and transiting, by the management node based on the first transition condition, the first dependent object from a current first service status to a second service status indicated in the status information of the first dependent object, to enable the network service to be automatically transited from the current service status to the target service status. In other words, in this embodiment of the present application, the dependent object on which the network service depends may be driven, based on a service status dependency between the network service and the dependent object, to perform the transition between the service statuses, finally completing a transition between service statuses of the network service, thereby implementing an automated process of the transition between the different service statuses of the network service.

In a possible design manner, the determining, by the management node, a first transition condition for transiting the network service from the current service status to the target service status includes: determining, by the management node based on a state machine of the network service, the first transition condition for transiting the network service from the current service status to the target service status.

In a possible design manner, the transiting, by the management node, the first dependent object from a current first service status to a second service status based on the first transition condition includes: determining, by the management node based on a state machine of the first dependent object, a second transition condition for transiting the first dependent object from the first service status to the second service status; determining, by the management node based on the second transition condition, a transition policy for transition from the first service status to the second service status, where the transition policy is used to configure a network device that carries the first dependent object; and executing, by the management node, the transition policy, to trigger the first dependent object to be transited from the first service status to the second service status.

In a possible design manner, if the second transition condition includes status information of a second dependent object on which the first dependent object depends, the transition policy includes: transiting the second dependent object from a current third service status to a fourth service status (where the fourth service status is a service status indicated in the status information of the second dependent object), and after the first transition condition is satisfied, triggering the network service to be transited from the current service status to the target service status.

In a possible design manner, after the executing, by the management node, the transition policy, the method further includes: transiting, by the management node, the state machine of the dependent object from the first service status to the second service status if the second transition condition is satisfied.

In a possible design manner, after the transiting, by the management node, the first dependent object from a current first service status to a second service status, the method further includes: detecting a current service status of the first dependent object; and transiting, by the management node, the state machine of the network service from the current service status to the target service status if the current service status of the first dependent object satisfies the first transition condition.

It can be learned that, according to the service state transition method provided in this embodiment of the present application, not only automated management of the transition between the different service statuses of the network service can be implemented, but also the service state transition can be implemented in a layered manner on a service layer and a network layer because state machines are set for different network services (on the service layer) and dependent objects (on the network layer) on which the network services depend. In this way, when the network service is transited between different application platforms, the state machine of the network service does not need to be changed, only a state machine of a dependent object of the network service and a dependency between state machines of different dependent objects need to be changed, and then a smooth transition of the network service can be implemented.

In a possible design manner, the first dependent object is a tunnel, the first service status is a stopped state, and the second service status is a provisioned state, where in this case, the transiting the first dependent object from a current first service status to a second service status includes: determining, by the management node based on a state machine of the tunnel, that a second transition condition for transiting the tunnel from the stopped state to the provisioned state is: configuration of the tunnel is completed; determining, by the management node based on the second transition condition, a transition policy for transition from the stopped state to the provisioned state, where the transition policy includes configuration information for establishing the tunnel; and sending, by the management node, the configuration information to a network device that carries the tunnel, where the configuration information is used to instruct the network device to establish the tunnel based on the configuration information.

In a possible design manner, the first dependent object is a tunnel, the first service status is a faulty state, and the second service status is a provisioned state, where in this case, the transiting the first dependent object from a current first service status to a second service status includes: determining, by the management node based on a state machine of the tunnel, that a second transition condition for transiting the tunnel from the faulty state to the provisioned state is: a fault of the tunnel is removed; determining, by the management node based on the second transition condition, a transition policy for transition from the faulty state to the provisioned state, where the transition policy includes a fault removal policy of the tunnel; and sending, by the management node, the fault removal policy to a network device that carries the tunnel, where the fault removal policy is used to instruct the network device to perform fault removal based on the fault removal policy.

According to a second aspect, an embodiment of the present application provides a management node, including: an obtaining unit, configured to obtain a target service status and a current service status of a network service; a determining unit, configured to determine a first transition condition for transiting the network service from the current service status to the target service status, where the first transition condition includes status information of a first dependent object on which execution of the network service depends; and a transition unit, configured to transit the first dependent object from a current first service status to a second service status based on the first transition condition, to trigger the network service to be transited from the current service status to the target service status, where the second service status is a service status indicated in the status information of the first dependent object.

In a possible design manner, the determining unit is specifically configured to determine, based on a state machine of the network service, the first transition condition for transiting the network service from the current service status to the target service status.

In a possible design manner, the transition unit is specifically configured to: determine, based on a state machine of the first dependent object, a second transition condition for transiting the first dependent object from the first service status to the second service status; determine, based on the second transition condition, a transition policy for transition from the first service status to the second service status, where the transition policy is used to configure a network device that carries first the dependent object; and execute the transition policy, to trigger the first dependent object to be transited from the first service status to the second service status.

In a possible design manner, the transition unit is further configured to transit the state machine of the first dependent object from the first service status to the second service status if the second transition condition is satisfied.

In a possible design manner, the transition unit is further configured to: detect a current service status of the first dependent object; and transit the state machine of the network service from the current service status to the target service status if the current service status of the first dependent object satisfies the first transition condition.

In a possible design manner, the first dependent object is a tunnel, the first service status is a stopped state, and the second service status is a provisioned state, where in this case, the transition unit is specifically configured to: determine, based on a state machine of the tunnel, that a second transition condition for transiting the tunnel from the stopped state to the provisioned state is: configuration of the tunnel is completed; determine, based on the second transition condition, a transition policy for transition from the stopped state to the provisioned state, where the transition policy includes configuration information for establishing the tunnel; and send the configuration information to a network device that carries the tunnel, where the configuration information is used to instruct the network device to establish the tunnel based on the configuration information.

In a possible design manner, the first dependent object is a tunnel, the first service status is a faulty state, and the second service status is a provisioned state, where in this case, the transition unit is specifically configured to: determine, based on a state machine of the tunnel, that a second transition condition for transiting the tunnel from the faulty state to the provisioned state is: a fault of the tunnel is removed; determine, based on the second transition condition, a transition policy for transition from the faulty state to the provisioned state, where the transition policy includes a fault removal policy the tunnel; and send the fault removal policy to a network device that carries the tunnel, where the fault removal policy is used to instruct the network device to perform fault removal based on the fault removal policy.

According to a third aspect, an embodiment of the present application provides a management node, including: a processor, a memory, a bus, and a communications interface, where the memory is configured to store a computer executable instruction, the processor is connected to the memory by using the bus, and when the management node is run, the processor executes the computer executable instruction stored in the memory, to enable the management node to perform the service state transition method according to any design manner in the first aspect.

According to a fourth aspect, an embodiment of the present application provides a computer storage medium, configured to store a computer software instruction used by the management node, and the computer storage medium includes a program designed for the management node to perform the foregoing aspects.

According to a fifth aspect, an embodiment of the present application provides a computer program. The computer program includes an instruction, and when the computer program is executed by a computer, the computer can perform the service state transition method according to any design manner in the first aspect.

In the present application, a name of the management node does not constitute a limitation on the device, and during actual implementation, these devices may have other names. The devices fall within the scope of the claims of the present application and equivalent technologies thereof, provided that the devices have functions that are similar to those in the present application.

In addition, for a technical effect brought by any design manner in the second aspect to the fifth aspect, refer to technical effects brought by the different design manners in the first aspect. Details are not described herein again.

These aspects or other aspects of the present application are more comprehensible in descriptions of the following embodiments.

DETAILED DESCRIPTION

The following describes the technical solutions in the embodiments of the present application in detail with reference to the accompanying drawings in the embodiments of the present application. Apparently, the described embodiments are merely some but not all of the embodiments of the present application.

In addition, the terms "first" and "second" are merely intended for a purpose of description, and shall not be understood as an indication or implication of relative importance or implicit indication of the number of indicated technical features. Therefore, a feature limited by "first" or "second" may explicitly or implicitly include one or more features. In the descriptions of the present application, unless otherwise provided, "a plurality of" means two or more than two.

An embodiment of the present application provides a service state transition method that may be applied to a management process for a life cycle of a network service.

Specifically, during a life cycle from a beginning of running to an end of running, each network service usually has a plurality of service statuses. Using a 4 Kbps (ultra high definition) service (the 4 Kbps service is a service whose resolution exceeds a resolution of a common high definition service; for example, the 4 Kbps service is a video service with 3840×2160 pixels, and a resolution of the 4 Kbps service is four times that (1920×1080 pixels) of the common high definition service; therefore, the service is referred to as the 4 Kbps service) as an example, service statuses of the 4 Kbps service may include a "stopped state", a "provisioned state", a "faulty state", and the like. A management node that manages the 4 Kbps service may set an independent state machine for the 4 Kbps service, to implement life cycle management of the 4 Kbps service.

Figure 1:
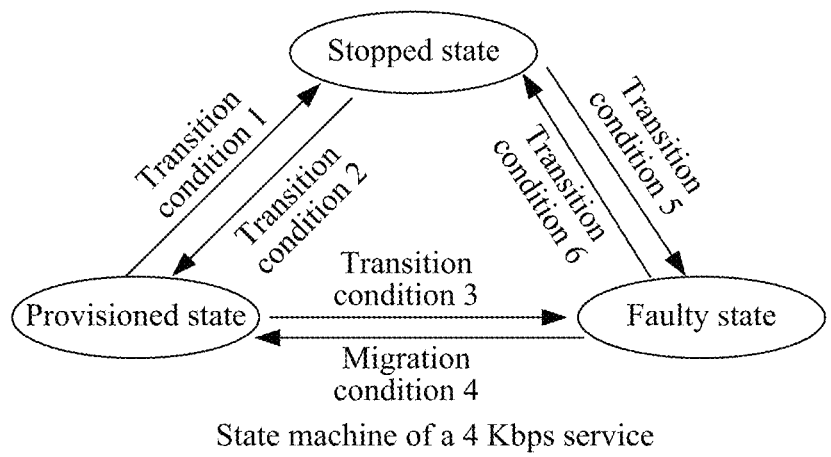
FIG. 1 is a schematic diagram of a state machine of a 4 Kbps service according to an embodiment of the present application.

The state machine is also referred to as a finite state machine (FSM), and is a mathematical model that represents a limited quantity of statuses, and behaviors such as a transition and an action between these statuses. For example, FIG. 1 is a schematic diagram of the state machine of the 4 Kbps service. In different transition conditions, the 4 Kbps service may be transited between the "stopped state", the "provisioned state", and the "faulty state" (this process of the transition between the service statuses may be alternatively described as a process of shifting or switching between the service statuses, and this is not limited in this embodiment of the present application). For example, a target service status that is set for the 4 Kbps service is the "provisioned state", and then when a current service status of the 4 Kbps service is the "stopped state", the current service status may be transited to the "provisioned state" if a transition condition 2 is satisfied. In other words, any network service is in a determined status (namely, a current service status) of a state machine of the network service at a moment, and in addition, the network service has a target status (namely, a target service status) at a determined moment.

A condition for implementing a transition between any two service statuses may depend on a service status of another object (in this embodiment of the present application, an object on which execution of the network service directly or indirectly depends is referred to as a dependent object). For example, the transition condition 2 for transiting the 4 Kbps service from the "stopped state" to the "provisioned state" is: an access-side tunnel and a backbone-side tunnel are both in the "provisioned state". In other words, a service status of a network service depends on a service status of a dependent object of the network service.

In the prior art, a process of a transition between service statuses is often completed by a manual operation or a fixed program.

For example, when the 4 Kbps service needs to be transited from the "stopped state" to the "provisioned state", an operation person needs to determine, from the state machine of the 4 Kbps service shown in FIG. 1, the transition condition 2 for transition from the "stopped state" to the "provisioned state", and separately perform corresponding configuration on the access-side tunnel and the backbone-side tunnel based on the transition condition 2, to enable the access-side tunnel and the backbone-side tunnel to be both in the "provisioned state", thereby triggering the state machine of the 4 Kbps service to be transited from the "stopped state" to the "provisioned state". In this case, when a dependency between a service status and a dependent object is relatively complex, according to the foregoing transition method, not only a large quantity of human resources needs to be used, but also service state transition efficiency is affected.

Alternatively, an operation person may develop corresponding program software, to implement a process of transiting the 4 Kbps service from the "stopped state" to the "provisioned state". However, the program software is applicable only to the transition of the 4 Kbps service from the "stopped state" to the "provisioned state". When a network service is changed (for example, changed to a network service other than the 4 Kbps service), or a service status of a network service is changed (for example, the 4 Kbps service is changed to the "faulty state" and needs to be transited to the "provisioned state"), or an association relationship between service statuses is changed (for example, a dependent object on which the 4 Kbps service depends or a service status of a dependent object is changed), the program software is not applicable any longer. It can be learned that, the foregoing method of implementing the service state transition by using the fixed program software has a relatively narrow application scope.

In the service state transition method provided in this embodiment of the present application, the management node may trigger, based on the service status dependency between a network service and a dependent object, the dependent object on which the network service depends to perform a transition between service statuses, finally completing the transition between the service statuses of the network service, so that when the network service is transited between different service statuses, a setting process of the corresponding dependent object may be automatically triggered based on the dependency, thereby implementing an automated process of the transition between the different service statuses of the network service.

It should be noted that, the dependent object may be specifically a network service object, for example, a tunnel (e.g., an access-side tunnel or a backbone-side tunnel) or a virtual private network (VPN), or may be a device object, for example, a network function virtualization (NFV) device or a port. This is not limited in this embodiment of the present application. Any object on which execution of the network service depends may serve as the dependent object.

In addition, when the network service, such as the 4 Kbps service, is executed, if the 4 Kbps service depends on another network service, in this case, a network service on which the 4 Kbps service depends may also serve as the dependent object. In addition, the 4 Kbps service is also a network service object, and may also serve as a dependent object to be depended on by another network service. This is not limited in this embodiment of the present application.

Figure 2:
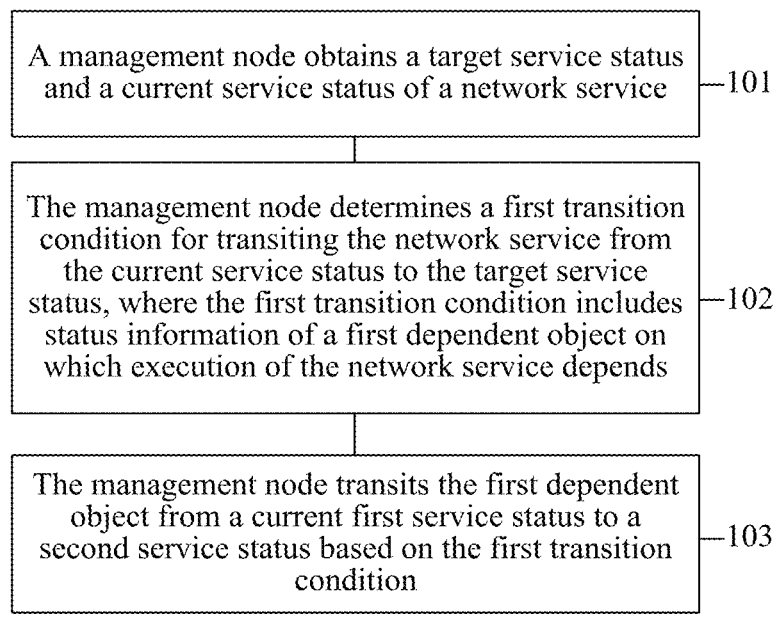
FIG. 2 is a schematic flowchart 1 of a service state transition method according to an embodiment of the present application.

Specifically, as shown in FIG. 2, an embodiment of the present application provides a service state transition method. The method includes the following steps.

101: A management node obtains a target service status and a current service status of a network service.

Figure 3:
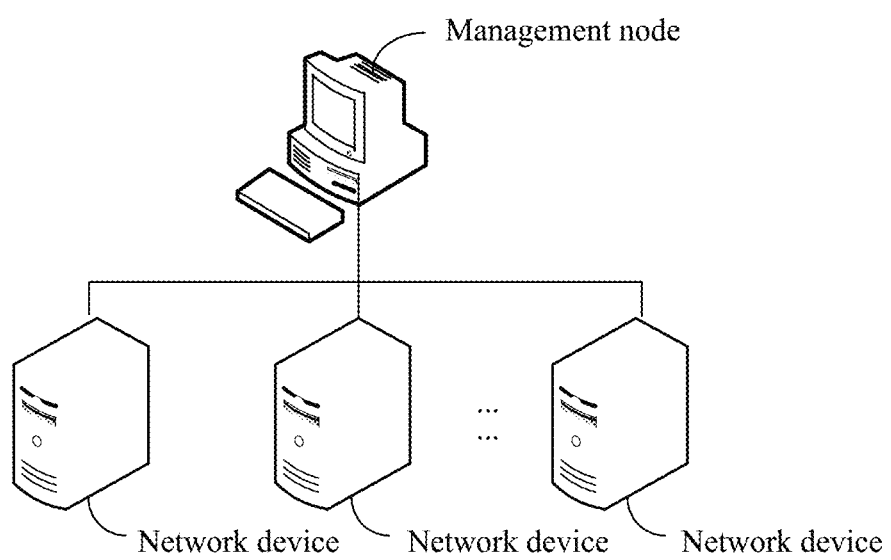
FIG. 3 is a schematic diagram of an application scenario of a service state transition method according to an embodiment of the present application.

Specifically, as shown in FIG. 3, the management node may be connected to N (N>1) network devices on which the network service is run. Then, the management node may determine, by detecting a running parameter of each network device, a current service status of a network service that is run on each network device.

For example, the management node may perform the service state transition method in a form of an independent device, or may be integrated, in a form of a functional module, into any device (for example, any network device shown in FIG. 3). This is not limited in this embodiment of the present application.

In a possible design manner, the management node may be deployed in management and orchestration (MANO) in an NFV system, and the MANO is connected to all of the N network devices.

Alternatively, the management node may be any general server unit. In this case, software or a computer instruction stored on the general server unit may be used to perform the service state transition method.

Alternatively, the management node may be at least one virtual machine (VM) that is run on the general server unit. Each virtual machine may be run in a different operating system. Therefore, application programs of virtual machines may be run in space of mutually independent operating systems. The virtual machine refers to a complete computer system that is simulated by using software, has a complete hardware system function, and is run in a completely isolated environment. The virtual machine may be configured to perform the service state transition method.

The target service status of the network service may be set by management personnel, or may be obtained by the management node by parsing an obtained service instruction. This is not limited in this embodiment of the present application. For example, when it is detected that the current service status of the network service is a "stopped state", an initial status of the network service in a state machine of the network service may be set to be the "stopped state". In this case, if the management node receives a service provisioning instruction, the management node determines that the target service status of the network service is a "provisioned state", and triggers the state machine of the network service to be transited from the "stopped state" to the "provisioned state".

102: The management node determines a first transition condition for transiting the network service from the current service status to the target service status, where the first transition condition includes status information of a first dependent object on which execution of the network service depends.

Specifically, when the state machine is set for the network service, a transition condition for a transition between different service statuses in the state machine is already preset. Therefore, in step 102, the management node may determine, from the state machine of the network service, the first transition condition for transiting the network service from the current service status to the target service status.

The first transition condition includes the status information of the first dependent object on which the execution of the network service depends. For example, the first transition condition for transiting the network service from the "stopped state" to the "provisioned state" is: a remotely accessed VPN is in the provisioned state. In other words, to enable the network service to be transited from the "stopped state" to the "provisioned state", the first dependent object, namely, the remotely accessed VPN, of the network service needs to be in the provisioned state.

It should be noted that, the status information of the first dependent object is only a necessary condition for transiting the network service from the current service status to the target service status. In other words, the first transition condition may further include a constraint, such as, a quantity of online users, other than the dependent object. This is not limited in this embodiment of the present application.

103: The management node transits the first dependent object from a current first service status to a second service status based on the first transition condition, to trigger the network service to be transited from the current service status to the target service status.

The status information of the first dependent object is used to indicate the target service status (namely, the second service status) of the dependent object. Then, in step 103, the management node may transit the first dependent object from the current first service status to the second service status based on the target service status that is of the dependent object and that is indicated in the first transition condition. In this way, if the first transition condition includes only the status information of the first dependent object, in this case, because the first dependent object is already in the second service status, in other words, the first transition condition is already satisfied, the management node may transit the state machine of the network service from the current service status to the target service status when detecting that the first dependent object is already in the second service status, thereby completing a process of automatically transiting the network service between different service statuses.

For example, similar to the state machine of the network service, respective state machines of different dependent objects may also be set by the management node. Then, in step 103, the management node may determine, based on a state machine of the first dependent object, a second transition condition for transiting the first dependent object from the first service status to the second service status. For example, the second transition condition for transiting the remotely accessed VPN from the "stopped state" to the "provisioned state" includes: the remotely accessed VPN is already established.

Then, the management node may determine, based on the second transition condition, a transition policy for transition from the first service status to the second service status. For example, the transition policy includes a configuration file for establishing the remotely accessed VPN. In other words, the transition policy may be used to configure the network device that carries the first dependent object. Then the management node may send the configuration file to the network device, so that the network device completes, based on the configuration file, a process of configuring the remotely accessed VPN, thereby establishing the remotely accessed VPN, to satisfy the second transition condition.

Then, when each item of content in the second transition condition is satisfied, a transition of the state machine of the first dependent object from the first service status to the second service status may be triggered, and because a service status of the first dependent object is changed to the second service status, in other words, satisfies the first transition condition, a transition of the state machine of the network service from the current service status to the target service status may be further triggered, completing the automatic transition of the network service between the different service statuses.

It should be noted that, a correspondence between different second transition conditions and different transition policies may be preset in the management node. In this way, after the second transition condition for transiting the first dependent object from the first service status to the second service status is determined, a corresponding transition policy may be found based on the correspondence. Alternatively, the management node may generate, based on the determined second transition condition, the transition policy for transition from the first service status to the second service status. This is not limited in this embodiment of the present application.

In addition, the second transition condition may include: status information of the second dependent object on which the first dependent object depends. In other words, the first dependent object can be transited from the first service status to the second service status only when the second dependent object is in a service status. For example, a provisioned state of a 4 Kbps service (the network service) depends on a provisioned state of a tunnel (the first dependent object), and the provisioned state of the tunnel depends on a provisioned state of a port (the second dependent object).

In this case, the transition policy determined by the management node includes: transiting the second dependent object from a current third service status to a fourth service status, where the fourth service status is a service status indicated in the status information of the second dependent object. Then, similar to step 103, the management node executes the transition policy, to be specific, transits the second dependent object from the current third service status to the fourth service status, and after the first transition condition is satisfied, triggers the network service to be transited from the current service status to the target service status.

It can be learned that, according to the service state transition method provided in this embodiment of the present application, not only automated management of the transition between the different service statuses of the network service can be implemented, but also the service state transition can be implemented in a layered manner on a service layer and a network layer because state machines are set for different network services (the service layer) and dependent objects (the network layer) on which the network services depend. In this way, when the network service is transited between different application platforms, the state machine of the network service does not need to be changed, only a state machine of a dependent object of the network service and a dependency between state machines of different dependent objects need to be changed, and then a smooth transition of the network service can be implemented.

Figure 4:
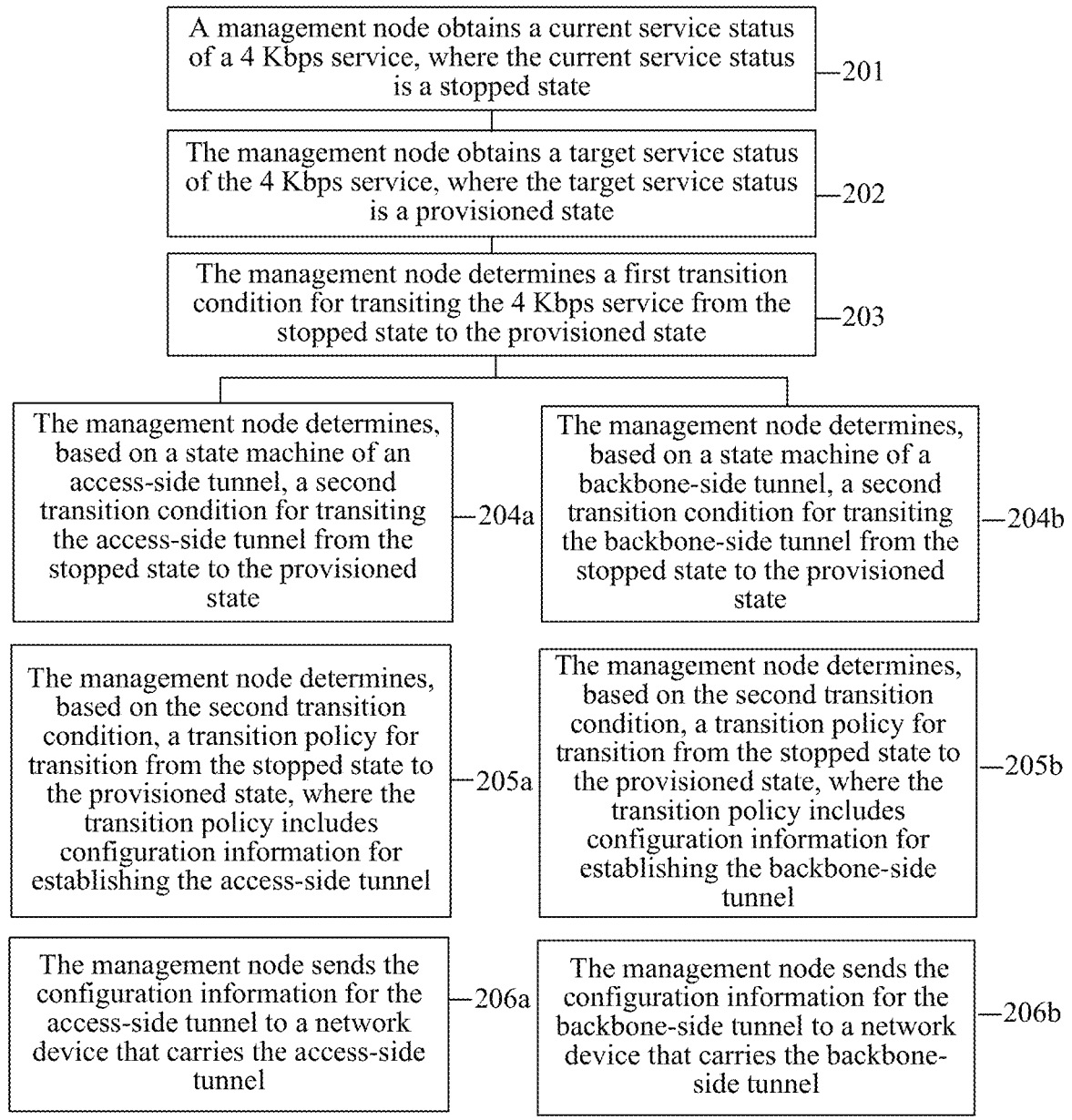
FIG. 4 is a schematic flowchart 2 of a service state transition method according to an embodiment of the present application.

For example, using an example in which the network service is the 4 Kbps service, the following describes a method for transiting the 4 Kbps service from the stopped state to the provisioned state. As shown in FIG. 4, the method includes the following steps.

201: A management node obtains a current service status of the 4 Kbps service, where the current service status is the stopped state.

202: The management node obtains a target service status of the 4 Kbps service, where the target service status is the provisioned state.

When it is detected that the current service status of the 4 Kbps service is the stopped state, an initial status in a state machine of the 4 Kbps service may be set to be the stopped state. In this case, if the management node receives a 4 Kbps service provisioning instruction, the management node determines that the target service status of the 4 Kbps service is the provisioned state, and triggers the state machine of the 4 Kbps service to be transited from the stopped state to the provisioned state.

203: The management node determines a first transition condition for transiting the 4 Kbps service from the stopped state to the provisioned state.

For example, the first transition condition may be: an access-side tunnel and a backbone-side tunnel are both in the provisioned state.

In other words, a first dependent object on which the 4 Kbps service depends includes the access-side tunnel and the backbone-side tunnel, and the access-side tunnel and the backbone-side tunnel need to be both in the provisioned state when the 4 Kbps service is transited from the stopped state to the provisioned state.

204a: The management node determines, based on a state machine of an access-side tunnel, a second transition condition for transiting the access-side tunnel from the stopped state to the provisioned state.

Figure 5:
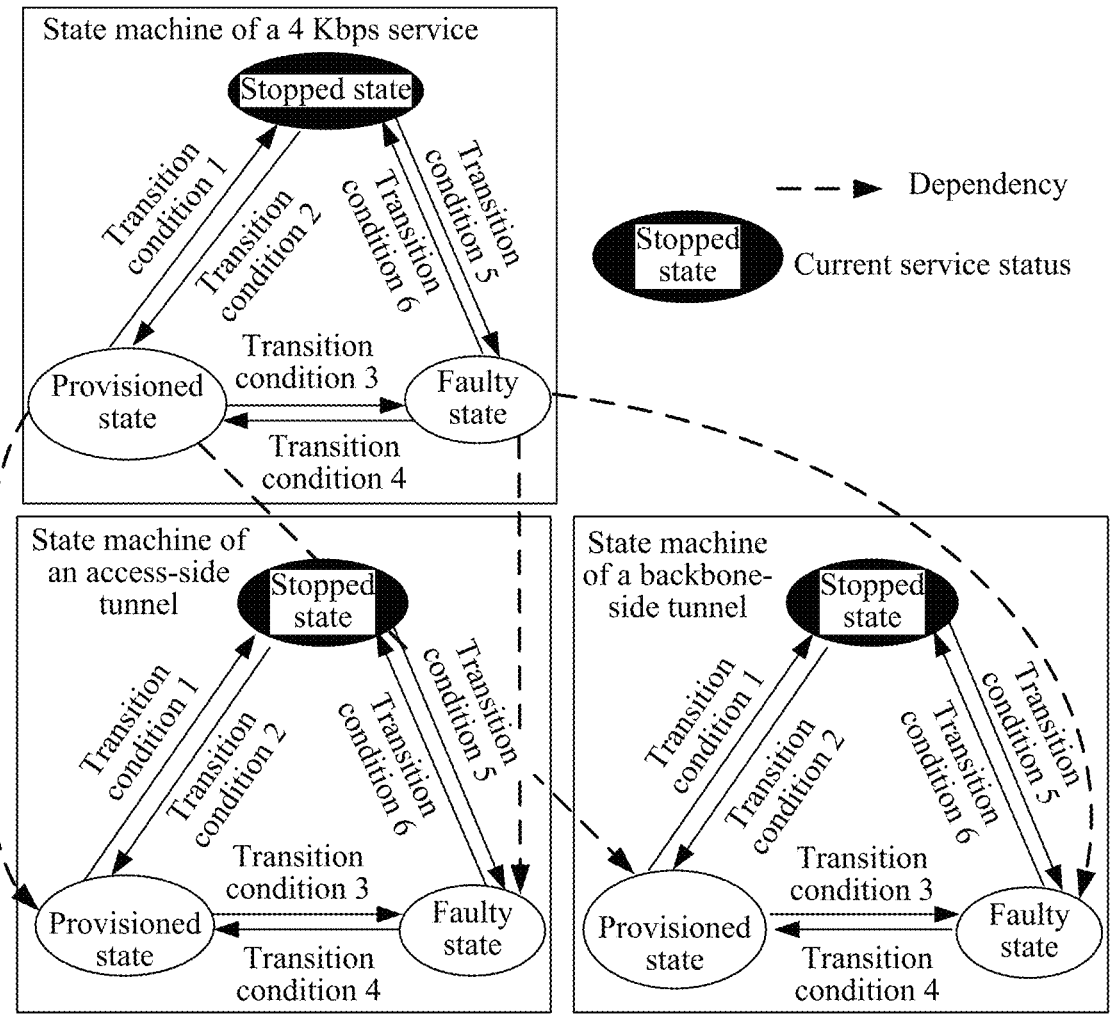
FIG. 5 is a schematic diagram 1 of a dependency between a state machine of a 4 Kbps service, a state machine of an access-side tunnel, and a state machine of a backbone-side tunnel according to an embodiment of the present application.

The management node may determine, by default, that current service statuses of the access-side tunnel and the backbone-side tunnel are the stopped state. FIG. 5 shows a dependency between the state machine of the 4 Kbps service, the state machine of the access-side tunnel, and a state machine of the backbone-side tunnel. The 4 Kbps service, the access-side tunnel, and the backbone-side tunnel are currently all in the stopped state, and the transition of the 4 Kbps service from the stopped state to the provisioned state depends on the provisioned state of the access-side tunnel and the provisioned state of the backbone-side tunnel. Then, the second transition condition for transiting the access-side tunnel from the stopped state to the provisioned state may be determined based on the state machine of the access-side tunnel (FIG. 5 schematically shows a transition condition 2 for the state machine of the access-side tunnel). For example, the second transition condition may be: configuration of the access-side tunnel is completed.

205a: The management node determines, based on the second transition condition, a transition policy for transition from the stopped state to the provisioned state, where the transition policy includes configuration information for establishing the access-side tunnel.

Specifically, the correspondence between the different second transition conditions and the different transition policies is set in the management node. Then, when the second transition condition is that when the configuration of the access-side tunnel is completed, a transition policy corresponding to the second transition condition can be obtained. For example, the transition policy may be the configuration information for establishing the access-side tunnel.

206a: The management node sends the configuration information for the access-side tunnel to a network device that carries the access-side tunnel, so that the network device establishes the access-side tunnel based on the configuration information.

After the management node sends the configuration information for the access-side tunnel to a network device that carries the access-side tunnel, the network device may establish the access-side tunnel based on the configuration information, so that configuration of the access-side tunnel is completed, that is, the second transition condition is satisfied, thereby triggering the state machine of the access-side tunnel to be transited from the stopped state to the provisioned state.

Similarly, the management node may further perform the following steps 204b to 206b, to complete configuration of the backbone-side tunnel, thereby triggering the state machine of the backbone-side tunnel to be transited from the stopped state to the provisioned state. It should be noted that, steps 204b to 206b and steps 204a to 206a may be separately or simultaneously performed. This is not limited in this embodiment of the present application.

204b: The management node determines, based on a state machine of a backbone-side tunnel, a second transition condition for transiting the backbone-side tunnel from the stopped state to the provisioned state.

The second transition condition is: configuration of the backbone-side tunnel is completed.

205b: The management node determines, based on the second transition condition, a transition policy for transition from the stopped state to the provisioned state, where the transition policy includes configuration information for establishing the backbone-side tunnel.

206b: The management node sends the configuration information for the backbone-side tunnel to a network device that carries the backbone-side tunnel, so that the network device establishes the backbone-side tunnel based on the configuration information.

In this way, after step 204b to 206b and step 204a to 206a, the state machine of the access-side tunnel is transited to the provisioned state, and the state machine of the backbone-side tunnel is also transited to the provisioned state, that is, the first transition condition determined in step 203 is satisfied, thereby triggering the state machine of the 4 Kbps service to be transited from the stopped state to the provisioned state, that is, implementing an automatic transition process of transiting the 4 Kbps service from the stopped state to the provisioned state.

Figure 6:
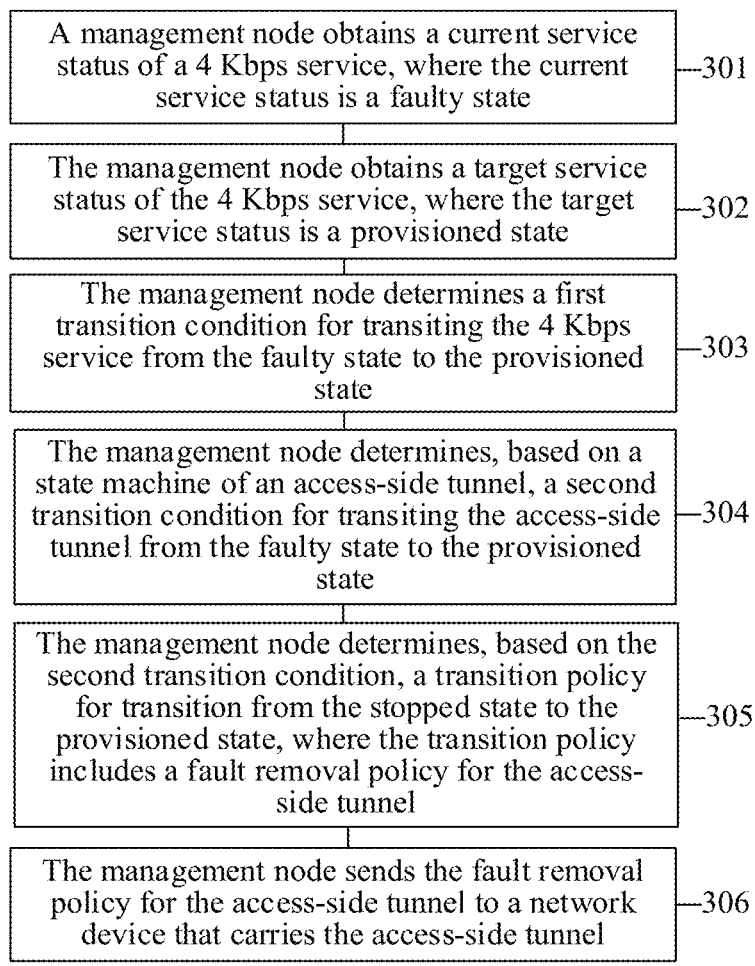
FIG. 6 is a schematic flowchart 3 of a service state transition method according to an embodiment of the present application.

For example, using an example in which the network service is the 4 Kbps service, the following describes a method for transiting the 4 Kbps service from a faulty state to the provisioned state. As shown in FIG. 6, the method includes the following steps.

301: A management node obtains a current service status of the 4 Kbps service, where the current service status is the faulty state.

For example, when the access-side tunnel on which the 4 Kbps service depends is in the faulty state, a fault is caused to occur on the 4 Kbps service. In this case, it may be detected that the current service status of the 4 Kbps service is the faulty state.

302: The management node obtains a target service status of the 4 Kbps service, where the target service status is the provisioned state.

When it is detected that the current service status of the 4 Kbps service is the faulty state, an initial status in a state machine of the 4 Kbps service may be set to be the faulty state. In this case, if the management node receives a 4 Kbps service provisioning instruction, the management node determines that the target service status of the 4 Kbps service is the provisioned state, and triggers the state machine of the 4 Kbps service to be transited from the faulty state to the provisioned state.

303: The management node determines a first transition condition for transiting the 4 Kbps service from the faulty state to the provisioned state.

For example, the first transition condition may be: an access-side tunnel and a backbone-side tunnel are both in the provisioned state.

In other words, a first dependent object on which the 4 Kbps service depends includes the access-side tunnel and the backbone-side tunnel, and the access-side tunnel and the backbone-side tunnel need to be both in the provisioned state when the 4 Kbps service is transited from the faulty state to the provisioned state.

304: The management node determines, based on a state machine of an access-side tunnel, a second transition condition for transiting the access-side tunnel from the faulty state to the provisioned state.

After determining that the first transition condition requires the access-side tunnel and the backbone-side tunnel to be both in the provisioned state, the management node may determine, based on current state machines of the access-side tunnel and the backbone-side tunnel, current service statuses of the access-side tunnel and the backbone-side tunnel.

Figure 7:
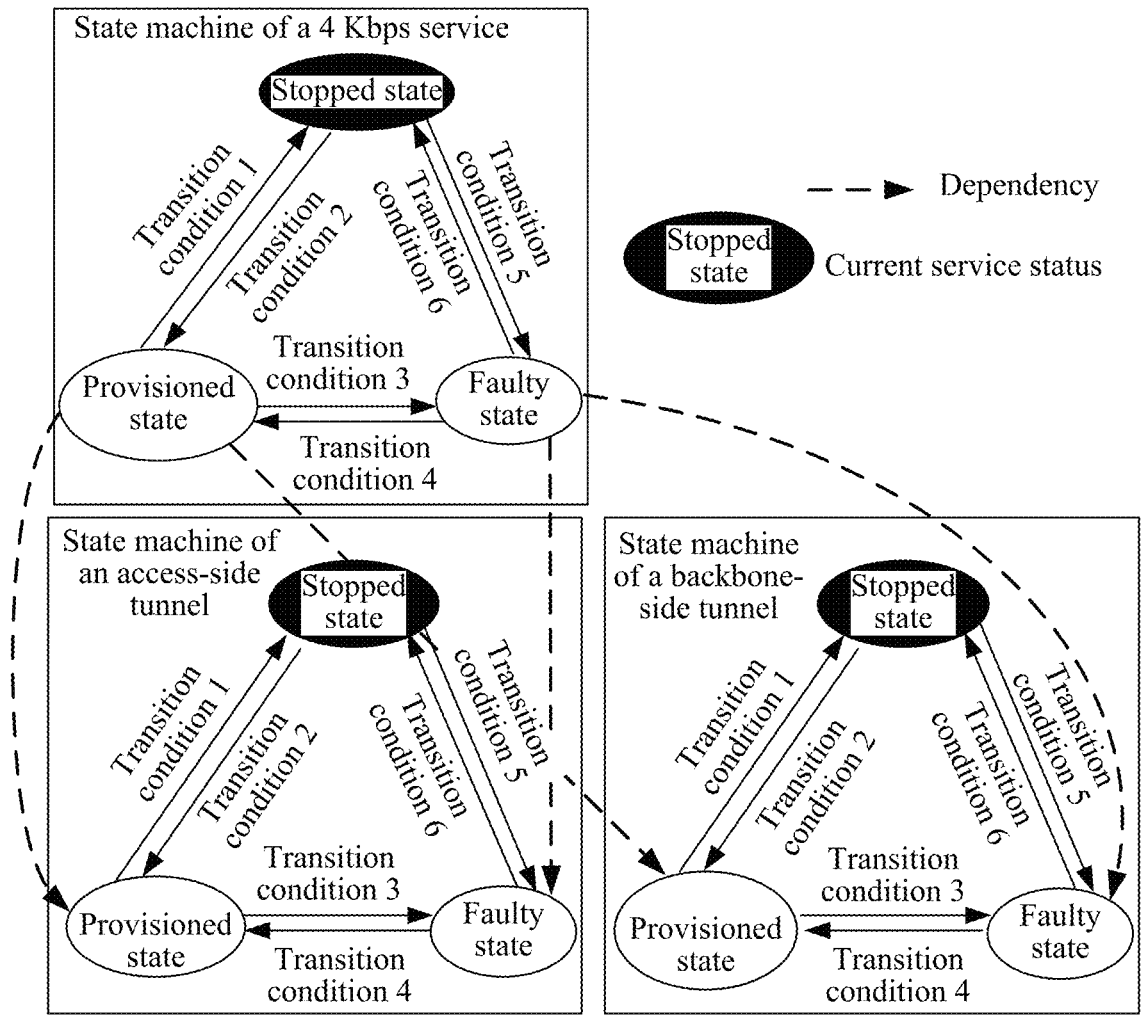
FIG. 7 is a schematic diagram 2 of a dependency between a state machine of a 4 Kbps service, a state machine of an access-side tunnel, and a state machine of a backbone-side tunnel according to an embodiment of the present application.

Still using an example in which the access-side tunnel is in the faulty state and the backbone-side tunnel is in the provisioned state, FIG. 7 shows a dependency between the state machine of the 4 Kbps service, the state machine of the access-side tunnel, and the state machine of the backbone-side tunnel. The 4 Kbps service and the access-side tunnel are currently both in the faulty state, and the backbone-side tunnel is currently in the provisioned state. A transition of the 4 Kbps service from the faulty state to the provisioned state depends on the provisioned state of the access-side tunnel and the provisioned state of the backbone-side tunnel, and the backbone-side tunnel is already in the provisioned state. Therefore, the management node may determine, based on the state machine of the access-side tunnel, the second transition condition for transiting the access-side tunnel from the faulty state to the provisioned state. For example, the second transition condition (which is schematically shown in FIG. 7 as a transition condition 4 in the state machine of the access-side tunnel) may be: a fault of the access-side tunnel is removed.

305: The management node determines, based on the second transition condition, a transition policy for transition from the stopped state to the provisioned state, where the transition policy includes a fault removal policy for the access-side tunnel.

Specifically, a correspondence between the different second transition conditions and the different transition policies is set in the management node. Then, when the second transition condition is that the fault of the access-side tunnel is removed, a transition policy corresponding to the second transition condition can be obtained. The transition policy includes the fault removal policy for the access-side tunnel, for example, a capacity expansion policy for the access-side tunnel.

306: The management node sends the fault removal policy for the access-side tunnel to a network device that carries the access-side tunnel, so that the network device performs a fault removal operation based on the fault removal policy.

After the management node sends the fault removal policy for the access-side tunnel to the network device that carries the access-side tunnel, the network device may perform the fault removal operation based on the fault removal policy, to remove the fault of the access-side tunnel, that is, the second transition condition is satisfied, thereby triggering the state machine of the access-side tunnel to be transited from the faulty state to the provisioned state.

In this case, the access-side tunnel and the backbone-side tunnel are both in the provisioned state, that is, the first transition condition determined in step 303 is satisfied, thereby triggering the state machine of the 4 Kbps service to be transited from the stopped state to the provisioned state, and implementing an automatic transition process of transiting the 4 Kbps service from the stopped state to the provisioned state.

The foregoing mainly describes the solutions provided in the embodiments of the present application from the perspective of interaction between network elements. It may be understood that, to implement the foregoing functions, the management node, and the like include a corresponding hardware structure and/or software module for performing each of the functions. A person of ordinary skill in the art should easily be aware that, in combination with the examples described in the embodiments disclosed in this specification, units, algorithms steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present application.

In the embodiments of the present application, functional modules of the management node may be divided based on the foregoing method examples. For example, each functional module may be divided based on each function, or two or more functions may be integrated into one processing module. The integrated module may be implemented in a form of hardware, or may be implemented in a form of a software functional module. It should be noted that the module division in the embodiments of the present application is an example, and is merely logical function division. There may be other division manners during actual implementation.

Figure 8:
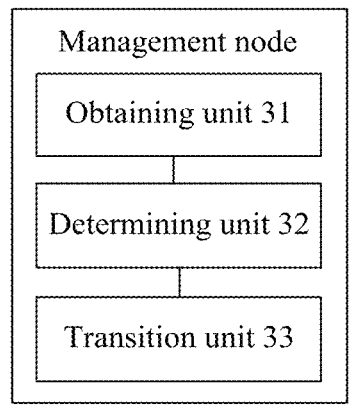
FIG. 8 is a schematic structural diagram 1 of a management node according to an embodiment of the present application.

When functional modules are divided corresponding to functions, FIG. 8 is a possible schematic structural diagram of the management node used in the foregoing embodiments. The management node includes: an obtaining unit 31, a determining unit 32, and a transition unit 33.

The obtaining unit 31 is configured to obtain a target service status and a current service status of a network service.

The determining unit 32 is configured to determine a first transition condition for transiting the network service from the current service status to the target service status, where the first transition condition includes status information of a first dependent object on which execution of the network service depends.

The transition unit 33 is configured to transit the first dependent object from a current first service status to a second service status based on the first transition condition, to trigger the network service to be transited from the current service status to the target service status, where the second service status is a service status indicated in the status information of the first dependent object.

Further, the determining unit 32 is specifically configured to determine, based on a state machine of the network service, the first transition condition for transiting the network service from the current service status to the target service status.

Further, the transition unit 33 is specifically configured to: determine, based on a state machine of the first dependent object, a second transition condition for transiting the first dependent object from the first service status to the second service status; determine, based on the second transition condition, a transition policy for transition from the first service status to the second service status, where the transition policy is used to configure a network device that carries the first dependent object; and execute the transition policy, to trigger the first dependent object to be transited from the first service status to the second service status.

Further, the transition unit 33 is further configured to transit the state machine of the first dependent object from the first service status to the second service status if the second transition condition is satisfied.

Further, the transition unit 33 is further configured to: detect a current service status of the first dependent object; and transit the state machine of the network service from the current service status to the target service status if the current service status of the first dependent object satisfies the first transition condition.

Further, the transition unit 33 is specifically configured to: determine, based on a state machine of the tunnel, that a second transition condition for transiting the tunnel from the stopped state to the provisioned state is: configuration of the tunnel is completed; determine, based on the second transition condition, a transition policy for transition from the stopped state to the provisioned state, where the transition policy includes configuration information for establishing the tunnel; and send the configuration information to a network device that carries the tunnel, where the configuration information is used to instruct the network device to establish the tunnel based on the configuration information.

For example, the obtaining unit 31 may be configured to support the management node in performing a process 101 in FIG. 2, processes 201 and 202 in FIG. 4, and processes 301 and 302 in FIG. 6. The determining unit 32 may be configured to support the management node in performing a process 102 in FIG. 2. The transition unit 33 may be configured to support the management node in performing a process 103 in FIG. 2, processes 204a to 206a and 204b to 206b in FIG. 4, and processes 304 to 306 in FIG. 6. All related content of the steps in the foregoing method embodiments may be quoted to function descriptions of the corresponding functional modules. Details are not described herein again.

Figure 9:
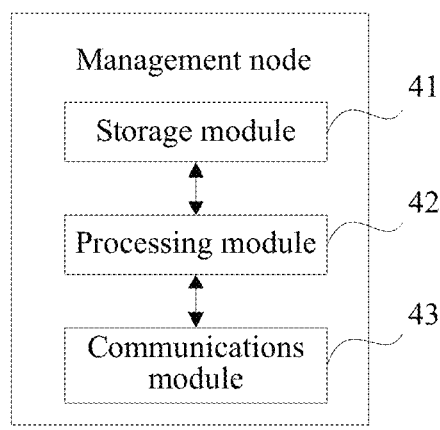
FIG. 9 is a schematic structural diagram 2 of a management node according to an embodiment of the present application.

When an integrated unit is used, FIG. 9 is a possible schematic structural diagram of the management node provided in the foregoing embodiments. The management node includes a processing module 42 and a communications module 43. The processing module 42 is configured to control and manage an action of the management node. For example, the processing module 42 is configured to support the management node in performing processes 101 to 103, 201 to 206a, 201 to 206b, and 301 to 306 in FIG. 2, and/or another process used for the technology described in this specification. The communications module 43 is configured to support the management node in communicating with another network entity. The management node may further include a storage module 41, configured to store program code and data of the management node.

The processing module 42 may be a processor or a controller, such as a central processing unit (CPU), a general-purpose processor, a digital signal processor (DSP), an application-specific integrated circuit (ASIC), a field programmable gate array (FPGA), or another programmable logical device, a transistor logical device, a hardware component, or a combination thereof. The controller/processor may implement or execute various example logical blocks, modules, and circuits described with reference to content disclosed in the present application. Alternatively, the processor may be a combination of processors implementing a computing function, for example, a combination of one or more microprocessors, or a combination of the DSP and a microprocessor. The communications module 43 may be a transceiver, a transceiver circuit, a communications interface, or the like. The storage module 41 may be a memory.

When the processing module 42 is the processor, the communications module 43 is the transceiver, and the storage module 41 is the memory, the management node provided in embodiments of the present application may be the management node shown in FIG. 9.

Figure 10:
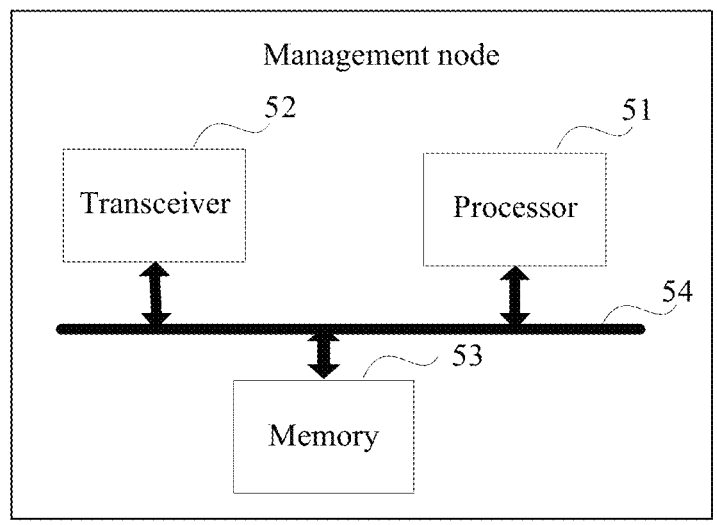
FIG. 10 is a schematic structural diagram 3 of a management node according to an embodiment of the present application.

As shown in FIG. 10, the management node includes: a processor 51, a transceiver 52, a memory 53, and a bus 54. The transceiver 52, the processor 51, and the memory 53 are connected to each other by using the bus 54. The bus 54 may be a peripheral component interconnect (PCI) bus, an Extended Industry Standard Architecture (EISA) bus, or the like. The bus may be classified into an address bus, a data bus, a control bus, and the like. For ease of representation, only one thick line is used to represent the bus in FIG. 10, but this does not mean that there is only one bus or only one type of bus.

Further, an embodiment of the present application further provides a computer storage medium, configured to store a computer software instruction used by the management node, and the computer storage medium includes a program designed for the management node to perform the foregoing aspects.

Further, an embodiment of the present application further provides a computer program. The computer program includes an instruction, and when the computer program is executed by a computer, the computer can perform the service state transition method.

Method or algorithm steps described in combination with the content disclosed in the present application may be implemented by hardware, or may be implemented by a processor by executing a software instruction. The software instruction may include a corresponding software module. The software module may be stored in a random access memory (RAM), a flash memory, a read-only memory (ROM), an erasable programmable read only memory (EPROM), an electrically erasable programmable read only memory (EEPROM), a register, a hard disk, a mobile hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in a core network interface device. Certainly, the processor and the storage medium may exist in the core network interface device as discrete components.

A person skilled in the art should be aware that in the foregoing one or more examples, functions described in the present application may be implemented by hardware, software, firmware, or any combination thereof. When the present application is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The foregoing descriptions are merely specific implementation manners of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A service state transition method, comprising:
obtaining, by a management node, a target service status and a current service status of a network service;
determining, by the management node, a first transition condition for transiting the network service from the current service status to the target service status, wherein the first transition condition comprises status information of a first dependent object on which execution of the network service depends, wherein the network service can be in any one of three or more possible service statuses that are finite in number, and can transition between any two of the possible service statuses in either direction, and wherein each possible transition comprising a respective transition start service status and a respective transition end service status is associated with a respective transition condition; and
transiting, by the management node, the first dependent object from a current first service status to a second service status based on the first transition condition, to trigger the network service to be transited from the current service status to the target service status, wherein the second service status is a service status indicated in the status information of the first dependent object, wherein the first dependent object is a tunnel, the first service status is a stopped state, and the second service status is a provisioned state, and transiting, by the management node, the first dependent object from the current first service status to the second service status includes: determining, by the management node based on a state machine of the tunnel, that a second transition condition for transiting the tunnel from the stopped state to the provisioned state is: configuration of the tunnel is completed, determining, by the management node based on the second transition condition, a transition policy for transition from the stopped state to the provisioned state, wherein the transition policy comprises configuration information for establishing the tunnel, and sending, by the management node, the configuration information to a network device that carries the tunnel for instructing the network device to establish the tunnel based on the configuration information.

2. The method according to claim 1, wherein determining, by the management node, a first transition condition for transiting the network service from the current service status to the target service status comprises:
determining, by the management node based on a state machine of the network service, the first transition condition for transiting the network service from the current service status to the target service status.

3. The method according to claim 1, wherein transiting, by the management node, the first dependent object from a current first service status to a second service status based on the first transition condition comprises:
determining, by the management node based on a state machine of the first dependent object, a second transition condition for transiting the first dependent object from the first service status to the second service status;
determining, by the management node based on the second transition condition, a transition policy for transition from the first service status to the second service status, wherein the transition policy is used to configure a network device that carries the first dependent object; and
executing, by the management node, the transition policy, to trigger the first dependent object to be transited from the first service status to the second service status.

4. The method according to claim 3, wherein when the second transition condition comprises status information of a second dependent object on which the first dependent object depends, the transition policy comprises: transiting the second dependent object from a current third service status to a fourth service status, wherein the fourth service status is a service status indicated in the status information of the second dependent object.

5. The method according to claim 3, wherein after executing, by the management node, the transition policy, the method further comprises:
transiting, by the management node, the state machine of the first dependent object from the first service status to the second service status when the second transition condition is satisfied.

6. The method according to claim 1, wherein after transiting, by the management node, the first dependent object from a current first service status to a second service status, the method further comprises:
detecting a current service status of the first dependent object; and
transiting, by the management node, the state machine of the network service from the current service status to the target service status when the current service status of the first dependent object satisfies the first transition condition.

7. A management node, comprising:
a non-transitory memory storing instructions; and
a processor coupled to the non-transitory memory, wherein the instructions, when executed by the processor, cause the management node to:
obtain a target service status and a current service status of a network service,
determine a first transition condition for transiting the network service from the current service status to the target service status, wherein the first transition condition comprises status information of a first dependent object on which execution of the network service depends, wherein the network service can be in any one of three or more possible service statuses that are finite in number, and can transition between any two of the possible service statuses in either direction, and wherein each possible transition comprising a respective transition start service status and a respective transition end service status is associated with a respective transition condition, and
transit the first dependent object from a current first service status to a second service status based on the first transition condition, to trigger the network service to be transited from the current service status to the target service status, wherein the second service status is a service status indicated in the status information of the first dependent object, wherein the first dependent object is a tunnel, the first service status is a stopped state, and the second service status is a provisioned state, and transiting, by the management node, the first dependent object from the current first service status to the second service status includes: determining, by the management node based on a state machine of the tunnel, that a second transition condition for transiting the tunnel from the stopped state to the provisioned state is: configuration of the tunnel is completed, determining, by the management node based on the second transition condition, a transition policy for transition from the stopped state to the provisioned state, wherein the transition policy comprises configuration information for establishing the tunnel, and sending, by the management node, the configuration information to a network device that carries the tunnel for instructing the network device to establish the tunnel based on the configuration information.

8. The management node according to claim 7, wherein the instructions, when executed by the processor, further cause the management node to:
determine, based on a state machine of the network service, the first transition condition for transiting the network service from the current service status to the target service status.

9. The management node according to claim 7, wherein the instructions, when executed by the processor, further cause the management node to:
determine, based on a state machine of the first dependent object, a second transition condition for transiting the first dependent object from the first service status to the second service status;
determine, based on the second transition condition, a transition policy for transition from the first service status to the second service status, wherein the transition policy is used to configure a network device that carries the first dependent object; and
execute the transition policy, to trigger the first dependent object to be transited from the first service status to the second service status.

10. The management node according to claim 9, wherein the instructions, when executed by the processor, further cause the management node to:
transit the state machine of the first dependent object from the first service status to the second service status when the second transition condition is satisfied.

11. The management node according to claim 7, wherein the instructions, when executed by the processor, further cause the management node to:
detect a current service status of the first dependent object; and
transit the state machine of the network service from the current service status to the target service status when the current service status of the first dependent object satisfies the first transition condition.

12. A non-transitory computer readable medium storing program code thereon executed by a processor for a service state transition, the program code comprising instructions for executing a method comprising:
obtaining a target service status and a current service status of a network service;
determining a first transition condition for transiting the network service from the current service status to the target service status, wherein the first transition condition comprises status information of a first dependent object on which execution of the network service depends, wherein the network service can be in any one of three or more possible service statuses that are finite in number, and can transition between any two of the possible service statuses in either direction, and wherein each possible transition comprising a respective transition start service status and a respective transition end service status is associated with a respective transition condition; and transiting the first dependent object from a current first service status to a second service status based on the first transition condition, to trigger the network service to be transited from the current service status to the target service status, wherein the second service status is a service status indicated in the status information of the first dependent object, wherein the first dependent object is a tunnel, the first service status is a stopped state, and the second service status is a provisioned state, and transiting the first dependent object from the current first service status to the second service status includes: determining based on a state machine of the tunnel, that a second transition condition for transiting the tunnel from the stopped state to the provisioned state is: configuration of the tunnel is completed, determining, by the management node based on the second transition condition, a transition policy for transition from the stopped state to the provisioned state, wherein the transition policy comprises configuration information for establishing the tunnel, and sending the configuration information to a network device that carries the tunnel for instructing the network device to establish the tunnel based on the configuration information.

13. The non-transitory computer readable medium according to claim 12, wherein the program code further comprises instructions for executing a method comprising:
determining, based on a state machine of the network service, the first transition condition for transiting the network service from the current service status to the target service status.

14. The non-transitory computer readable medium according to claim 12, wherein the program code further comprises instructions for executing a method comprising:
determining, based on a state machine of the first dependent object, a second transition condition for transiting the first dependent object from the first service status to the second service status;
determining, based on the second transition condition, a transition policy for transition from the first service status to the second service status, wherein the transition policy is used to configure a network device that carries the first dependent object; and
executing the transition policy to trigger the first dependent object to be transited from the first service status to the second service status.

15. The non-transitory computer readable medium according to claim 14, wherein when the second transition condition comprises status information of a second dependent object on which the first dependent object depends, the program code further comprises instructions for executing a method comprising:
transiting the second dependent object from a current third service status to a fourth service status, wherein the fourth service status is a service status indicated in the status information of the second dependent object.

16. The non-transitory computer readable medium according to claim 14, wherein the program code further comprises instructions for executing a method comprising:
transiting the state machine of the first dependent object from the first service status to the second service status when the second transition condition is satisfied.

17. The non-transitory computer readable medium according to claim 12, wherein the program code further comprises instructions for executing a method comprising:
detecting a current service status of the first dependent object; and transiting the state machine of the network service from the current service status to the target service status when the current service status of the first dependent object satisfies the first transition condition.

* * * * *